(12) United States Patent  (10) Patent No.:     US 7,003,658 B2
Chen                            (45) Date of Patent:         Feb. 21, 2006

(54) METHOD FOR USER SETUP OF MEMORY THROTTLING REGISTER IN NORTH BRIDGE VIA BIOS TO SAVE POWER

(75) Inventor: Song Bor Chen, Taipei (TW)

(73) Assignee: Inventec Corporation, Taipei (TW)

( * ) Notice: Subject to any disclaimer, the term of this patent is extended or adjusted under 35 U.S.C. 154(b) by 745 days.

(21) Appl. No.: 10/078,440

(22) Filed: Feb. 21, 2002

(65) Prior Publication Data

US 2003/0159024 A1    Aug. 21, 2003

(51) Int. Cl.
 *G06F 15/177*  (2006.01)
(52) U.S. Cl. .......................... 713/2; 710/104; 713/320
(58) Field of Classification Search ............... 365/226; 710/104; 713/2, 320
See application file for complete search history.

(56) References Cited

U.S. PATENT DOCUMENTS

| 6,199,127 | B1 * | 3/2001  | Ajanovic ............ 710/100 |
| 6,356,965 | B1 * | 3/2002  | Broyles et al. ....... 710/104 |
| 6,401,202 | B1 * | 6/2002  | Abgrall ............... 713/2 |
| 6,523,111 | B1 * | 2/2003  | Smolski .............. 713/2 |
| 6,662,278 | B1 * | 12/2003 | Kahn et al. .......... 711/154 |
| 6,748,524 | B1 * | 6/2004  | Stepp et al. ......... 713/1 |

* cited by examiner

*Primary Examiner*—Thomas Lee
*Assistant Examiner*—Albert Wang
(74) *Attorney, Agent, or Firm*—Jacobson Holman PLLC

(57) ABSTRACT

A method for achieving power saving for computers through memory throttling by adding the appropriate program codes into the BIOS, so that the invention may set the register of a north bridge chip according to the needs of the user, and enable or disable the memory throttling function provided by the chipset.

4 Claims, 2 Drawing Sheets

METHOD FOR USER SETUP OF MEMORY THROTTLING REGISTER IN NORTH BRIDGE VIA BIOS TO SAVE POWER

FIELD OF THE INVENTION

The invention relates to a power saving method for computers, and more particularly, a method of achieving power saving for computers through memory throttling.

BACKGROUND OF THE INVENTION

Power management is a very crucial element for computers, and when a computer is temporarily not in use but does not need to be shut down, it is usually necessary to disable some computer components that are power consuming, such as the monitor or hard disk, in order to save power. However, this only solves part of the problem, as the computer still has other components that are power consuming. Therefore only shutting down the monitor and hard disk is still insufficient for saving the computer's power.

The most commonly used methods of power saving in the past were shutting down the monitor, hard disk, or controlling the CPU by using functions such as a Intel's sleep mode settings of speed step or deeper sleep. But in fact, there are still many other parts of the system not included in the three parts mentioned above that are power consuming, such as the chipset and the memory, etc. So, in order to control these other parts of the system that are power consuming through the system settings, a simple and convenient method for saving the power consumption of a computer is required.

OBJECT AND SUMMARY OR THE INVENTION

The invention provides a method for power saving for computers through memory throttling in order to resolve the aforementioned problems. The method involves adding appropriate program codes into the basic input/output system (BIOS) of the computer, whereby the register of the north bridge, such as the register of Intel's Brookdale-M GMCH, is set to enable the memory throttling function, so when the condition set is achieved, the memory begins throttling, and thus saving power.

The invention includes the following steps:

First, the register is set according to the user's setup values. Then, a power on self test (POST) is performed, followed by a processing-suspending program to issue a suspension request. The setup screen as well as the options is displayed, then the result of the user's selection is stored to a non-volatile random access memory (NVRAM). The system is rebooted, and the authority of control is then turned over to the operating system (OS).

A detailed description of the invention is provided with drawings in a later section.

BRIEF DESCRIPTIONS OF THE DRAWINGS

Figure 1:
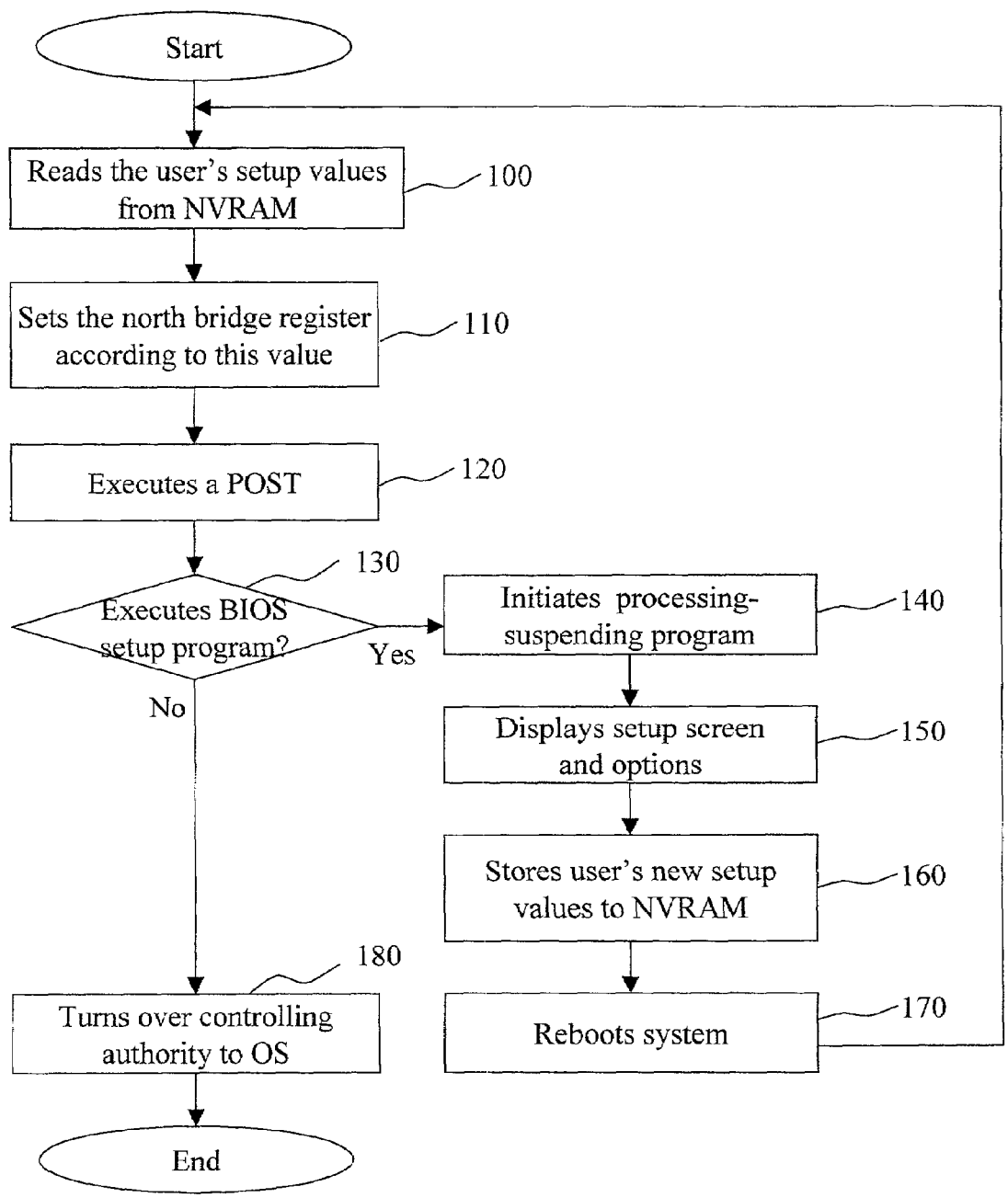
Figure 2:
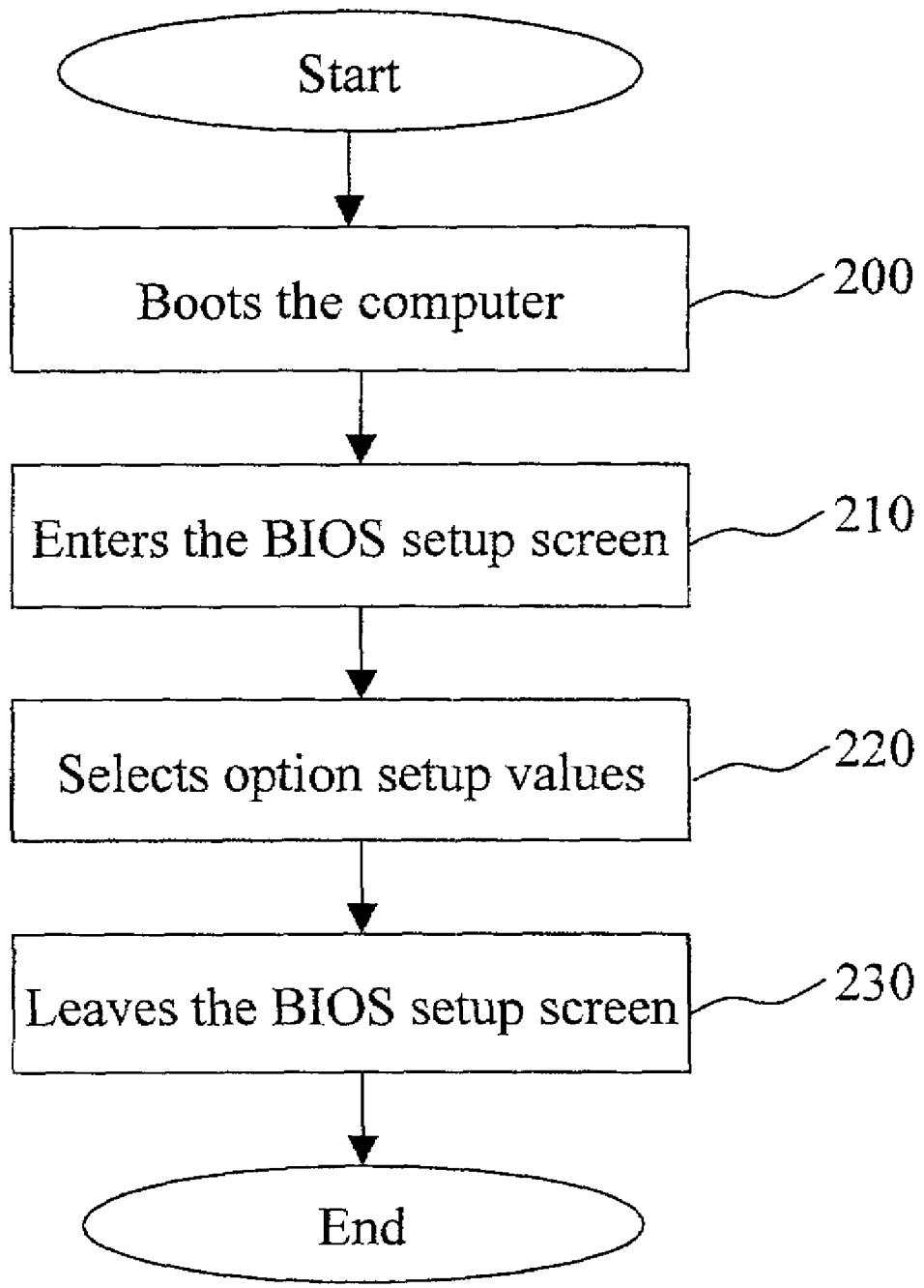

FIG. 1 is a procedural flowchart of the invention; and
FIG. 2 is a procedural flowchart of the invention's user operations.

DETAILED EXPLANATION OF THE INVENTION

The invention is a method to achieve power saving for computers through memory throttling. The method involves adding appropriate program codes into the Basic Input/Output System (BIOS) in order to set the register of the North Bridge and enable the function of memory throttling.

The method used in the past to achieve power saving involves shutting down the monitor, hard disk, and control of the Central Processing Unit (CPU), where a darkened screen display (the power source of the monitor is not completely shut down), or turning off the monitor's power, achieve the objective of power saving. In addition, there is the Doze Mode that allows a user to set the period of time that the computer is left idle before entering sleep mode, which has a range of setting values from one minute to one hour. If it is disabled, then the power management skips this mode and directly enters the next mode of Standby or Suspend. In the mid-level power saving mode of the Standby Mode, the allowable setup values are also from one minute to one hour. If it is disabled, then the power management skips this mode and directly enters the next mode of Suspend. In the highest level of power saving of the Suspend Mode, the allowable setup values are also from one minute to one hour. However, if it is disabled, it then means that the system will not enter the suspend mode due to the power saving operation.

Another method for saving power is to shut down the hard disk. The amount of power used to drive the hard disk accounts for a very large percentage of overall power use by a computer system. The user may set the hard disk to be shut down after the hard disk is idle for a certain period of time, which is generally set at around 1–15 minutes, with the setting of "disabled" as the default. However, if a period of time has been set, and the hard disk is suspended, then it must take some time in order for the system operation to recover again.

The method provided by the invention is achieved by setting the north bridge's memory throttling. Generally speaking, a chipset includes two chips, in which the North Bridge is operated at high frequency and is coupled to the processor, the system memory, and the display hardware. Because the North Bridge needs more connecting pins, it has a larger size. Given the fact that the interface to the processor and the memory includes a large number of signal lines, the north bridge chip also needs a larger number of pins when packaged. Since the north bridge chip determines the speed of data flow between the processor, the memory, and the displaying device, it has an obvious impact on system performance. Additionally, because the North Bridge also contains the interface to the system memory, it also restricts the use of the system memory.

The effect of the north bridge chip on system performance consists mainly of the memory bandwidth, integrated latency, individual memory latency, data bandwidth for connecting to the display device, and the data bandwidth for connecting to the south bridge. In a multitasking environment, when the data in the memory is accessed through the North Bridge, it reduces the memory processing time, and causes a significant improvement in the transmission efficiency. Thus, the invention uses these features to save power, which are not yet provided by manufacturers at this time.

Since Intel does not support the function that allows the setup to be modified from Windows, there isn't any product currently available that provides the option of allowing the user to adjust this function independently. So, if the operating system supports the function of memory throttling provided by the chipset, then the bandwidth of the memory throughput may be reduced, thus achieve the effect of saving power. Although there are currently some chipsets that provide this function, because this function does not affect the normal operation of the system, the BIOS does not enable this function. Or, even if the function is enabled, it still does not allow the function to be chosen freely by users.

The invention provides a preferred embodiment for describing the feasibility of the method proposed by the invention. FIG. 1 is a procedural flowchart of the method for achieving power saving for computers through memory throttling provided by the invention, as well as an explanation of the procedures of the invention. The explanation is as follows:

The system information of personal computers is generally stored in a Non-Volatile Random Access Memory (NVRAM), which can be a Complementary Metal-Oxide Semiconductor (CMOS). The information stored in the NVRAM usually includes information of the hard disk type, the number of tracks, the number of sectors for each track, the number of surfaces for recording data, the system time and date, the number and capacity of floppy disks, monitor type, and the amount of memory. These setup values usually can be identified or modified from the BIOS. The BIOS is a program recorded in the flash memory of the motherboard that records all items of hardware in the computer, and serves as a bridge of communication for the operating system. This program does not lose the information when the computer is shut down. Many high-end computers' BIOS support the power saving function. Additionally, the BIOS also serve as an interface between the operating system and hardware, where if the operating system needs to use some of the hardware, it is processed through the BIOS.

The procedure of the invention is as follows: the computer first uses the NVRAM to read the user's setup values in step 100. In step 110, the register of the North Bridge is set according to the setup values. In step 120, a power on self test (POST) is performed. In step 130, the setup program of the BIOS is executed. In step 140, the processing-suspending program is initiated. In step 150, a suspension request is issued (the suspending vector of this suspending request is INT 10h). After the suspending request is issued, the setup screen and options are displayed to allow the user to make selections. After the user completes his/her selection, the selection result is stored to the NVRAM (step 160). The system is rebooted (step 170). The controlling authority is turned over to the operating system (step 180). In so doing, the user is then allowed to decide whether or not to enable the function according to personal preference or situation of usage. The user only needs to enter the setup function of the BIOS, such as the F10 setup of the BIOS, in order to switch between enabling and disabling memory throttling. In its application, the invention has considerable convenience and flexibility.

FIG. 2 is the invention's procedural flowchart for user operation. The description of the procedure is as follows:

This procedural flowchart is described from the user's point of view to illustrate the steps of the operation. After the user turns on the computer (step 200), it first enters the BIOS setup screen (step 20), and the setup values of the options are chosen (step 220). Then after memory throttling is enabled, it then exits from the BIOS setup screen (step 230).

If a user wishes to prolong the operating period of a notebook computer, the function of memory throttling can be enabled. If the playing of animation is desired, then this function may be disabled. When the product is in the development and testing stage, and considerations of the worst case scenario are necessary, the tester of the new product may disable the memory throttling through the function provided by the invention, so as to perform a thermal test, electromagnetic interference test, battery life test and other testing.

EFFECT OF INVENTION

According to the forgoing analysis of the technical solutions of the invention, many advantages in its practical application can be delineated, which are as follows:
1. Power consumption of the computer is reduced, thus increasing the operating time of the computer, as well as enhancing convenience.
2. The user may choose whether or not to enable the function, thus further enhancing convenience.
3. The function is achieved via software without increasing the hardware cost, and may increase the functionality and selling points of the computer, as well as its added value.

Although the invention has been described in detail using the preferred embodiments, the invention is not limited to the disclosed embodiments, and anyone who is skilled in the related arts may be able to make various modifications, which do not depart from the scope or spirit of the invention. Therefore, it is intended that the invention covers such modifications and variations provided they fall within the scope of the following claims and their equivalents.

What is claimed is:

1. A method of achieving power saving for a computer through memory throttling, using a basic input/output system (BIOS) to setup a chipset for providing the function of memory throttling; such method of achieving power saving for a computer through memory throttling comprises the steps of:
 reading a set of user setup values from a non-volatile random access memory, (NVRAM);
 setting a register according to the user's setup value;
 executing a power-on self test (POST);
 calling a processing-suspending program to issue a suspension request;
 displaying a setup screen with options;
 storing a new set of user setup values to the NVRAM;
 rebooting the system; and
 turning over a controlling authority to an operating system (OS);
 wherein the function of the memory throttling is used to reduce a bandwidth of memory throughput;
 wherein the user's setup value may enable or disable the memory throttling; and
 wherein the register is a register of a north bridge.

2. The method of achieving power saving for a computer through memory throttling as described in claim 1, wherein the NVRAM includes a complementary metal-oxide semiconductor (CMOS).

3. The method of achieving power saving for a computer through memory throttling as described in claim 1, wherein the setup screen with the option items is set through the BIOS.

4. The method of achieving power saving for a computer through memory throttling as described in claim 1, wherein the suspending request has a suspending vector of INT 10h.

* * * * *